(12) United States Patent
Hamada

(10) Patent No.: US 8,672,530 B2
(45) Date of Patent: Mar. 18, 2014

(54) DISPLAY DEVICE

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 91 days.

(21) Appl. No.: 13/377,573

(22) PCT Filed: Mar. 16, 2010

(86) PCT No.: PCT/JP2010/054390
§ 371 (c)(1),
(2), (4) Date: Dec. 12, 2011

(87) PCT Pub. No.: WO2011/001718
PCT Pub. Date: Jan. 6, 2011

(65) Prior Publication Data
US 2012/0087151 A1 Apr. 12, 2012

(30) Foreign Application Priority Data
Jul. 3, 2009 (JP) ................................. 2009-158536

(51) Int. Cl.
*F21V 7/04* (2006.01)

(52) U.S. Cl.
USPC ........... 362/628; 362/612; 362/615; 362/621; 362/632

(58) Field of Classification Search
USPC .......... 362/600, 612, 615, 621, 628, 632–634
See application file for complete search history.

(56) References Cited

U.S. PATENT DOCUMENTS

2006/0176712 A1 8/2006 Takada
2008/0316767 A1* 12/2008 Woo et al. ..................... 362/612

FOREIGN PATENT DOCUMENTS

| CN | 1673826 A | 9/2005 |
|---|---|---|
| CN | 101169553 A | 4/2008 |
| JP | 2004-186004 A | 7/2004 |
| JP | 2006-139020 A | 6/2006 |
| JP | 2006-185852 A | 7/2006 |

OTHER PUBLICATIONS

Official Communication issued in International Patent Application No. PCT/JP2010/054390, mailed on Apr. 20, 2010.
Hamada, "Liquid Crystal Display Apparatus", U.S. Appl. No. 13/320,917, filed Nov. 17, 2011.
English translation of Official Communication issued in corresponding Chinese Patent Application No. 201080026862.1, mailed on Nov. 4, 2013.

* cited by examiner

*Primary Examiner* — Stephen F Husar
*Assistant Examiner* — Meghan Dunwiddie
(74) *Attorney, Agent, or Firm* — Keating & Bennett, LLP

(57) ABSTRACT

Disclosed is a display device wherein a light emitting element can have a longer service life, while suppressing luminance unevenness without causing an increase in cost or size. The display device comprises a light guide plate (21), an LED (25) that is arranged on the side of at least one corner portion (21d) of the light guide plate (21), a frame (4) that has a lateral portion (4b), and a bezel (5) that has a lateral portion (5b). The LED (25) is attached to a part (4d) of the lateral portion (4b) of the frame (4), and the part (4d) is thermally connected to a part (5d) of the lateral portion (5b) of the bezel (5).

11 Claims, 16 Drawing Sheets ated by the LED.
DISPLAY DEVICE

TECHNICAL FIELD

The present invention relates to a display device that uses light generated by a light emitting element to perform display operation.

BACKGROUND ART

Conventionally, a light source unit is known which uses an LED (light emitting diode), which is a light emitting element, as a light source. And, such a conventional light unit is disposed in a liquid crystal display device that is a display device, thereby functioning as a backlight unit that illuminates a liquid crystal display panel. In other words, display operation of the liquid crystal display device as a conventional display device is performed by means of light generated by the LED.

Hereinafter, a structure of the conventional backlight unit, which uses the LED as the light source, is described. Here, there are a direct type of backlight unit and an edge light type backlight unit; the backlight unit described hereinafter is the edge light type.

The conventional backlight unit, as shown in FIG. 24, includes at least: a light guide plate 101 that outputs surface light to a liquid crystal display panel (not shown); and a plurality of LEDs 102 that generate the light which is output from the light guide plate 101. The light guide plate 101 is substantially rectangular when viewed from its plate-thickness direction and has: a light introduction surface (a surface for introducing light inside) 101a that is formed of a predetermined side surface; and a light output surface (a surface for outputting the light introduced inside as surface light to the liquid crystal display panel) 101b that is formed of a ceiling surface. Besides, the plurality of LEDs 102 are linearly arranged along the light introduction surface 101a of the light guide plate 101 such that each light emitting surface faces the light introduction surface 101a of the light guide plate 101.

And, in the conventional backlight unit, when light is generated by the plurality of LEDs 102, the light generated by the plurality of LEDs 102 is introduced from the light introduction surface 101a of the light guide plate 101 into an inside of the light guide plate 101. Thereafter, the light introduced into the inside of the light guide plate 101 turns into surface light and is output from the light output surface 101b of the light guide plate 101.

Here, although not shown, a reflection sheet is disposed on a rear surface (a surface opposite to the light output surface 101b) of the light guide plate 101, and an optical sheet is disposed on the light output surface 101b of the light guide plate 101.

In the meantime, in the conventional backlight unit shown in FIG. 24, the light generated by the LED 102 travels spreading radially, so that if a distance between adjacent LEDs 102 is large, dark regions (regions marked by hatching in the figure), into which the light spreads only slightly, occur near the light introduction surface 101a of the light guide plate 101, which cause brightness unevenness. As ways of solving this disadvantage, there are: a way of extending a distance between the light introduction surface 101a of the light guide plate 101 and the LED 102; and a way of increasing the number of LEDs 102 to reduce the distance between the adjacent LEDs 102 (see FIG. 25). However, if these ways are employed, a disadvantage occurs, in which the size becomes large and the cost increases.

Because of this, conventionally, a backlight unit which is able to solve the above various disadvantages is proposed (e.g., see a patent document 1). Specifically, in the conventional proposed backlight unit, as shown in FIG. 26, a side surface of one corner portion of a plurality of corner portions of the light guide plate 101 is inclined with respect to other side surfaces, and the inclined surface of the light guide plate 101 is used as the light introduction surface 101a. And, the LED 102 is disposed near the corner portion where the light introduction surface 101a of the light guide plate 101 is present. According to this structure, even if only one LED 102 is used and the distance between the light introduction surface 101a of the light guide plate 101 and the LED 102 is made small, increase in dark regions (regions marked by hatching in the figure) is curbed.

CITATION LIST

Patent Literature

PLT1: JP-A-2006-185852

SUMMARY OF INVENTION

Technical Problem

However, in the conventional proposed backlight unit, the light introduction surface 101a is formed on the one corner portion of the plurality of corner portions of the light guide plate 101, and there the LED 102 is disposed to obtain a desired effect; however, measures for radiating heat, which concentrates on the one corner portion of the light guide plate 101 near which the LED 102 is disposed, are not taken. Accordingly, in the conventional proposed backlight unit, the LED 102 deteriorates thanks to heat generated from itself, and as a result of which, there is a problem that life of the LED 102 becomes short.

Solution to Problem

The present invention has been made to solve the above problems, and it is an object of the present invention to provide a display device that is able to achieve a long life of a light emitting element while curbing occurrence of brightness unevenness without causing cost increase and size enlargement.

To achieve the above object, a display device according to an aspect of the present invention includes:

a light guide plate that includes a plurality of corner portions; a light emitting element that is disposed near at least one corner portion of the plurality of corner portions of the light guide plate;

a display panel that is disposed on the light guide plate;

a first case member that includes: a bottom portion on which the light guide plate is placed; and a first side portion that encloses at least part of a circumference of the light guide plate; and a second case member that includes: an upper surface portion that is disposed on the display panel; and a second side portion that encloses at least part of the circumference of the light guide plate.

And, the light emitting element is disposed near a first portion of the first side portion of the first case member; and the first portion of the first side portion of the first case member is thermally connected to a second portion of the second side portion of the second case member.

In the display device according to the aspect of the present invention, as described above, the light emitting element is disposed near at least one corner portion of the plurality of corner portions of the light guide plate; accordingly, if an LED, light generated from which travels spreading radially, is used as the light emitting element, it is possible to spread the light into a substantially entire region of an inside of the light guide plate without increasing the number of the light emitting elements and significantly spacing the light emitting element away from the light guide plate. Accordingly, the cost does not increase, the size does not become large, and it is possible to curb occurrence of brightness unevenness.

And, in the display device according to the aspect, in addition to the above structure, the light emitting element is disposed near the first portion of the first side portion of the first case member, and the first portion of the first side portion of the first case member is thermally connected to the second portion of the second side portion of the second case member, whereby heat conduction from the first portion of the first side portion of the first case member to the second portion of the second side portion of the second case member increases, so that it is possible to easily transmit heat generated from the light emitting element from the first portion of the first side portion of the first case member to the second portion of the second side portion of the second case member. According to this, the heat generated from the light emitting element is efficiently radiated, and it is possible to alleviate the light emitting element being deteriorated by the heat from itself.

As a result of these, in the display device according to the aspect, it becomes possible to achieve a long life of the light emitting element while curbing occurrence of brightness unevenness without causing cost increase and size enlargement.

In the display device according to the above aspect, it is preferable that a region enclosed by the first side portion of the first case member includes a plurality of first corner portions; and the first portion of the first side portion of the first case member defines at least one of the plurality of first corner portions of the first case member. According to this structure, by placing the light guide plate on the bottom portion of the first case member such that positions of the plurality of first corner portions of the first case member and positions of the plurality of corner portions of the light guide plate are substantially aligned with each other, it is possible to easily dispose the light emitting element near at least one corner portion of the plurality of corner portions of the light guide plate.

Besides, in the display device according to the above aspect, it is preferable that a region enclosed by the second side portion of the second case member includes a plurality of second corner portions; and the second portion of the second side portion of the second case member defines at least one of the plurality of second corner portions of the second case member. According to this structure, the first portion of the first side portion of the first case member and the second portion of the second side portion of the second case member both define the corner portions; accordingly, by disposing the first case member and the second case member such that the positions of the first corner portions of the first case member and the positions of the second corner portions of the second case member are substantially aligned with each other, it is easy to thermally connect the first portion of the first side portion of the first case member and the second portion of the second side portion of the second case member to each other.

In the display device according to the above aspect, it is preferable that the light guide plate includes: a ceiling surface; a rear surface; and a side surface that connects to the ceiling surface and the rear surface; a side surface of the one corner portion of the plurality of corner portions, near which the light emitting element is disposed, is obliquely inclined with respect to another side surface; and the light emitting element is disposed near the first portion of the first side portion of the first case member so as to face the inclined side surface of the light guide plate. According to this structure, it is possible to easily spread the light into the substantially entire region of the inside of the light guide plate.

In the structure in which the side surface of the corner portion of the light guide plate, near which the light emitting element is disposed, is obliquely inclined with respect to another side surface, it is preferable that the first portion of the first side portion of the first case member includes a tapered shape along the inclined side surface of the light guide plate. According to this structure, by disposing the light emitting element near the first portion of the first side portion of the first case member, it is possible to easily dispose the light emitting element oppositely to the inclined side surface of the light guide plate. Here, the tapered shape is an obliquely inclined shape.

In the structure in which the first portion of the first side portion of the first case member includes the tapered shape along the inclined side surface of the light guide plate, a heat conductive member may be inserted between the first portion of the first side portion of the first case member and the second portion of the second side portion of the second case member; and the first portion of the first side portion of the first case member and the second portion of the second side portion of the second case member may be thermally connected to each other via the heat conductive member. According to this structure, without making the first portion of the first side portion of the first case member and the second portion of the second side portion of the second case member come into contact with each other, it is possible to thermally connect the first portion of the first side portion of the first case member and the second portion of the second side portion of the second case member to each other.

Besides, in the structure in which the first portion of the first side portion of the first case member includes the tapered shape along the inclined side surface of the light guide plate, the second portion of the second side portion of the second case member may define a tapered shape that reflects a shape of the first portion of the first side portion of the first case member. According to this structure, it is possible to make the first portion of the first side portion of the first case member and the second portion of the second side portion of the second case member face in parallel with each other, which is preferable when thermally connecting them to each other by making the first portion of the first side portion of the first case member and the second portion of the second side portion of the second case member come into contact with each other. Here, the tapered shape is an obliquely inclined shape.

In the structure in which the second portion of the second side portion of the second case member defines the tapered shape that reflects the shape of the first portion of the first side portion of the first case member, the second portion of the second side portion of the second case member may be provided thereon with a protrusion portion that protrudes toward the first side portion of the first case member; and the first portion of the first side portion of the first case member and the protrusion portion formed on the second portion of the second side portion of the second case member may be thermally connected to each other.

Besides, in the structure in which the second portion of the second side portion of the second case member defines the tapered shape that reflects the shape of the first portion of the first side portion of the first case member, the second portion of the second side portion of the second case member may include a spring characteristic; and the second portion of the second side portion of the second case member may be held while biasing the first portion of the first side portion of the first case member. According to this structure, the second portion of the second side portion of the second case member becomes unlikely to go away from the first portion of the first side portion of the first case member, so that it is possible to more surely achieve thermal connection between the first portion of the first side portion of the first case member and the second portion of the second side portion of the second case member.

In this case, it is preferable that the second portion of the second side portion of the second case member is connected to the upper surface portion, and separated from another portion of the second side portion. According to this structure, the second portion of the second side portion of the second case member becomes displaceable with respect to a border, that is, a fulcrum, with the upper surface portion. According to this, the second portion of the second side portion of the second case member is able to easily have the spring characteristic (a bias force that biases the first portion of the first side portion of the first case member).

Besides, in the structure in which the second portion of the second side portion of the second case member defines the tapered shape that reflects the shape of the first portion of the first side portion of the first case member, the second portion of the second side portion of the second case member may be fixed, by means of a screw, to the first portion of the first side portion of the first case member. According to this structure, it is possible to easily and surely connect thermally the first side portion of the first case member and the second side portion of the second case member to each other.

In the display device according to the above aspect, it is preferable that the first case member and the second case member are each formed of a metal. According to this structure, it is possible to efficiently radiate the heat generated from the light emitting element.

Advantageous Effects of Invention

As described above, according to the present invention, it is easy to obtain a display device that is able to achieve a long life of the light emitting element while curbing occurrence of brightness unevenness without causing cost increase and size enlargement.

DESCRIPTION OF EMBODIMENTS (First Embodiment)

First, a structure of a display device according to a first embodiment is described with reference to FIG. 1 to FIG. 5.

Figure 1:
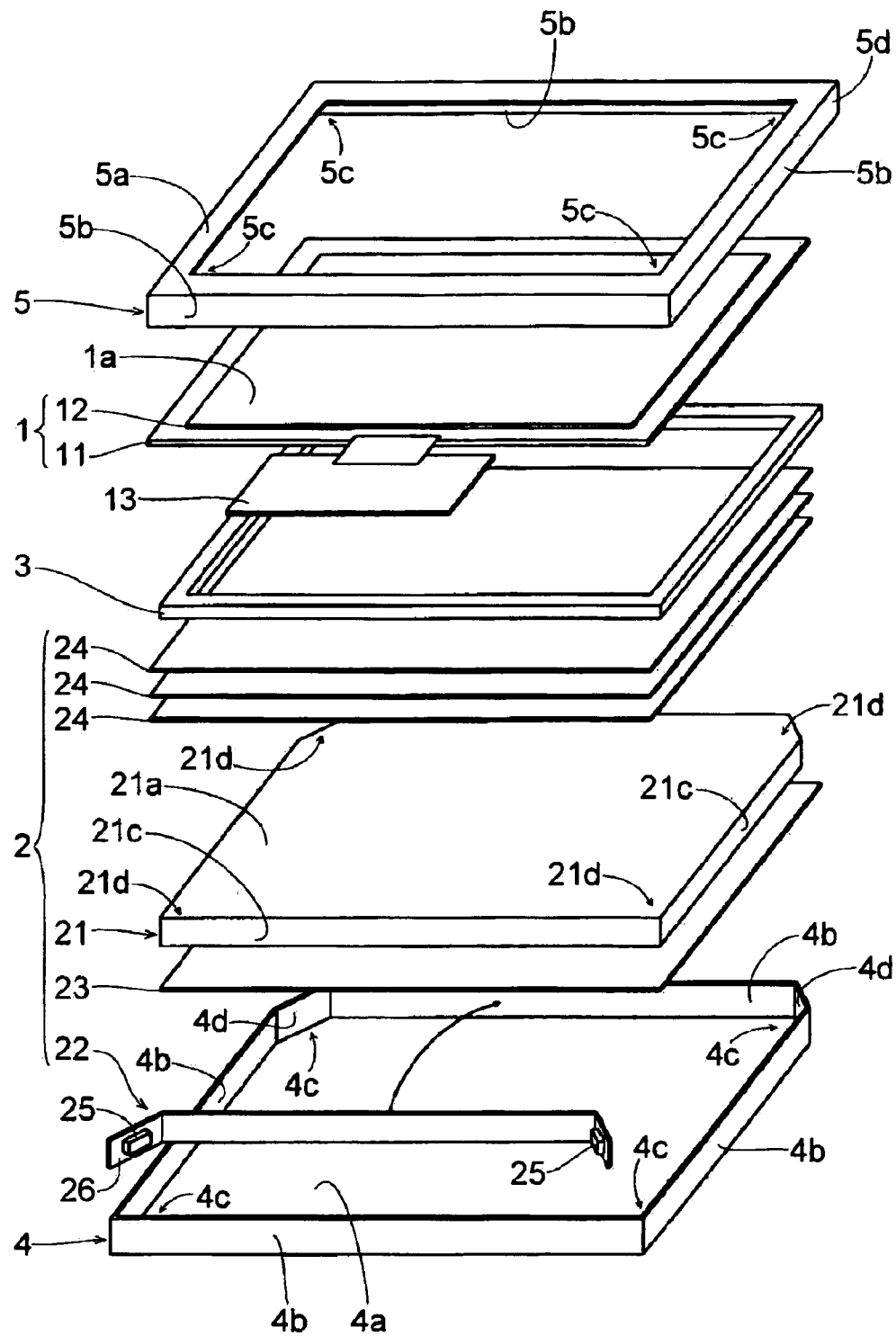
[FIG. 1] is an exploded perspective view of a liquid crystal display device according to a first embodiment.

The display device according to the first embodiment is a liquid crystal display device that, as shown in FIG. 1, includes: a liquid crystal display panel 1 that has a display surface 1*a*; an edge light type of backlight unit 2 that is disposed on a rear surface (a surface opposite to the display surface) of the liquid crystal display panel 1 and others. Here, the liquid crystal display panel 1 is an example of a "display panel" of the present invention.

The liquid crystal display panel 1 according to the first embodiment includes at least: a liquid crystal layer (not shown); a pair of glass boards 11 that sandwich the liquid crystal layer; and two light polarization plates 12 that are each disposed on a surface of the pair of glass boards 11 opposite to the liquid crystal layer. Here, in FIG. 1, of the two light polarization plates 12, only the light polarization plate 12 facing the display surface 1a of the liquid crystal display panel 1 is shown. Besides, a drive circuit 13 for driving a thin film transistor (not shown) formed on one of the pair of glass boards 11 is connected to the one of the pair of glass boards 11.

Figure 2:
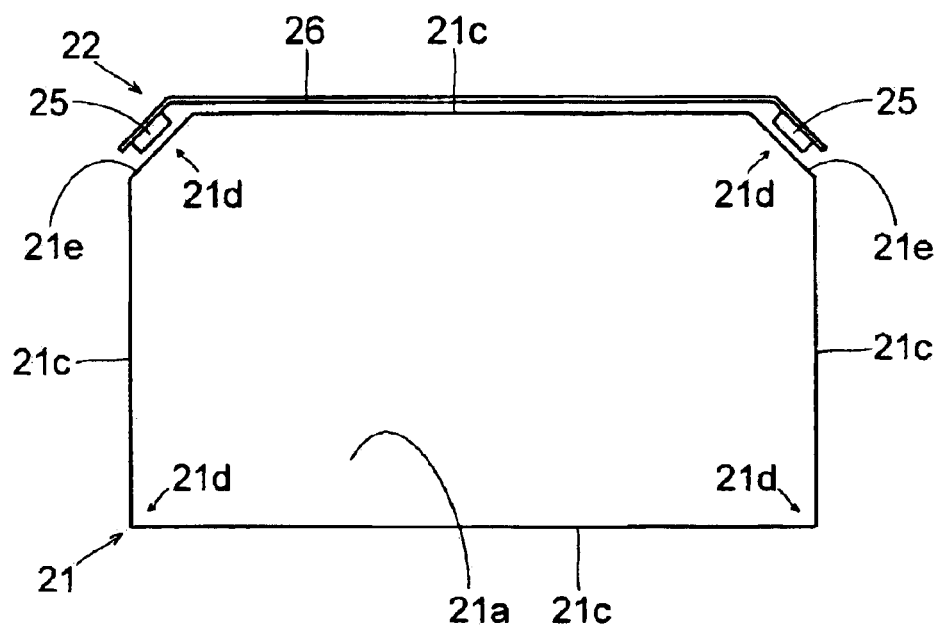
[FIG. 2] is a plan view (a view with a reflection sheet and an optical sheet omitted) of a backlight unit that is disposed in the liquid crystal display device according to the first embodiment.
Figure 3:
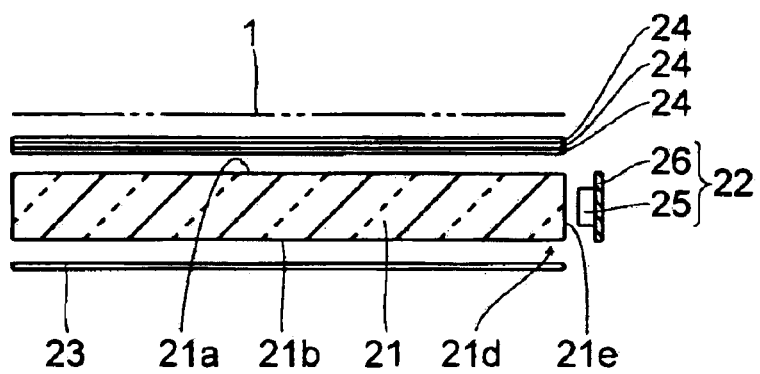
[FIG. 3] is a sectional view of a backlight unit that is disposed in the liquid crystal display device according to the first embodiment.

Besides, the backlight unit 2 in the first embodiment, as shown in FIG. 1 to FIG. 3, includes at least: a light guide plate 21; an LED module 22; a reflection sheet 23; and an optical sheet 24. Here, in FIG. 2, for clear understanding of the figure, the reflection sheet 23 and the optical sheet 24 are not shown.

The light guide plate 21 is formed of a light-transmissive plate member and has a function to change light introduced in its inside into surface light and output the surface light to the liquid crystal display panel 1. As a specific structure, the light guide plate 21 includes: a ceiling surface 21a; a rear surface 21b that is a surface opposite to the ceiling surface 21a; and a side surface 21c that connects to the ceiling surface 21a and the rear surface 21b. And, in a state where the backlight unit 2 is disposed to the rear side of the liquid crystal display panel 1, the ceiling surface 21a of the light guide plate 21 faces the liquid crystal display panel 1. In other words, the ceiling surface 21a of the light guide plate 21 defines a light output surface (a surface for outputting the light introduced in the inside to the liquid crystal display panel 1).

Besides, when viewing the light guide plate 21 from a plate thickness direction, the light guide plate 21 defines a shape (a substantially rectangular shape) that has four corner portions 21d; of the four corner portions 21d, side surfaces 21c of two corner portions 21d that are situated at both ends (each one end of a pair of short edges) of one long edge are obliquely inclined with respect to the other side surfaces 21c. And, in the first embodiment, of the side surfaces 21c of the light guide plate 21, the inclined two side surfaces 21c (hereinafter, called inclined surfaces 21e) are used as light introduction surfaces (surfaces for introducing the light into the inside). Each of the two inclined surfaces 21e of the light guide plate 21 has an inclination angle of about 45° and is finished to be a mirror surface.

The LED module 22 has an LED 25 as a light emitting element disposed on an FPC (flexible printed circuit) 26, and functions as a light source that generates the light introduced into the inside of the light guide plate 21. In other words, the LED module 22 is disposed along one long edge of the light guide plate 21 such that a light emitting surface of the LED 25 faces the inclined surface 21e of the light guide plate 21.

Here, in the first embodiment, two LEDs 25 are used and are each disposed on two regions that face the inclined surfaces 21e of the light guide plate 21. Besides, the two LEDs 25 are disposed on the same FPC 26 and the FPC 26 is bent along the side surface 21c (which includes the two inclined surfaces 21e) of the one long edge of the light guide plate 21. In other words, both ends of the FPC 26 respectively face the two inclined surfaces 21e of the light guide plate 21; and a portion between both the ends of the FPC 26 faces a not-inclined side surface (a side surface between the two inclined surfaces 21e) of the light guide plate 21. And, the LEDs 25 are each disposed on both the ends of the FPC 26.

Besides, the reflection sheet 23 is disposed on the rear surface 21b of the light guide plate 21 and covers the entire surface of the rear surface 21b of the light guide plate 21. By disposing the reflection sheet 23, the rear surface 21b of the light guide plate 21 defines a reflection surface, so that light leak from the rear surface 21b of the light guide plate 21 is curbed and light use efficiency increases.

The optical sheet 24 is disposed on the ceiling surface 21a of the light guide plate 21 and covers the entire surface of the ceiling surface 21b of the light guide plate 21. The optical sheet 24 has a plurality of sheets (a diffusion sheet, a prism sheet and others) stacked on one another, and performs diffusion and collection of the light output from the ceiling surface 21a of the light guide plate 21. And, the liquid crystal display panel 1 is illuminated with the light that is diffused and collected by the optical sheet 24. Here, in FIG. 1 and FIG. 3, the optical sheet 24, which has three sheets stacked on one another, is shown; however, the number of sheets is not especially limited.

Besides, as shown in FIG. 1, a rectangular plastic frame 3 is disposed between the liquid crystal display panel 1 and the backlight unit 2. And, an outer edge of the optical sheet 24 is pushed against an edge portion of the plastic frame 3 so as to hold a stacked body which includes the reflection sheet 23, the light guide plate 21 and the optical sheet 24 that are stacked in this order.

Besides, the liquid crystal display panel 1 and the backlight unit 2 are sandwiched by the frame 4 on the rear surface side and the bezel 5 on the ceiling surface side. Here, the frame 4 is an example of a "first case member" of the present invention and the bezel 5 is an example of a "second case member" of the present invention.

The frame 4 is formed of a metal and obtained by deforming a plate member formed of aluminum, iron or the like. The frame 4 includes: a bottom portion 4a; and a side portion 4b formed vertically on an outer circumference of the bottom portion 4a, and is formed such that a region enclosed by the four side portions 4b defines a substantially rectangular shape that has four corner portions 4c. And, the region enclosed by the side portions 4b on the bottom portion 4a of the frame 4 is used as a housing region. Here, the side portion 4b of the frame 4 is an example of a "first side portion" of the present invention and the corner portion 4c is an example of a "first corner portion" of the present invention.

The constituent members (21 to 24) of the backlight unit 2 are housed in the housing region; of these, the reflection sheet 23, the light guide plate 21 and the optical sheet 24 are stacked in this order on the bottom portion 4a of the frame 4. Here, in this state, the rear surface 21b (see FIG. 3) of the light guide plate 21 faces the bottom surface 4a of the frame 4, while the side surface 21c (see FIG. 2), which includes the two inclined surfaces 21e of the light guide plate 21, faces the side portion 4b of the frame 4. Further, the respective long edges (short edges) of the light guide plate 21 and of the frame 4 are parallel with each other; and positions of the corner portions 21d of the light guide plate 21 and positions of the four corner portions 4c of the frame 4 are substantially aligned with each other.

Figure 4:
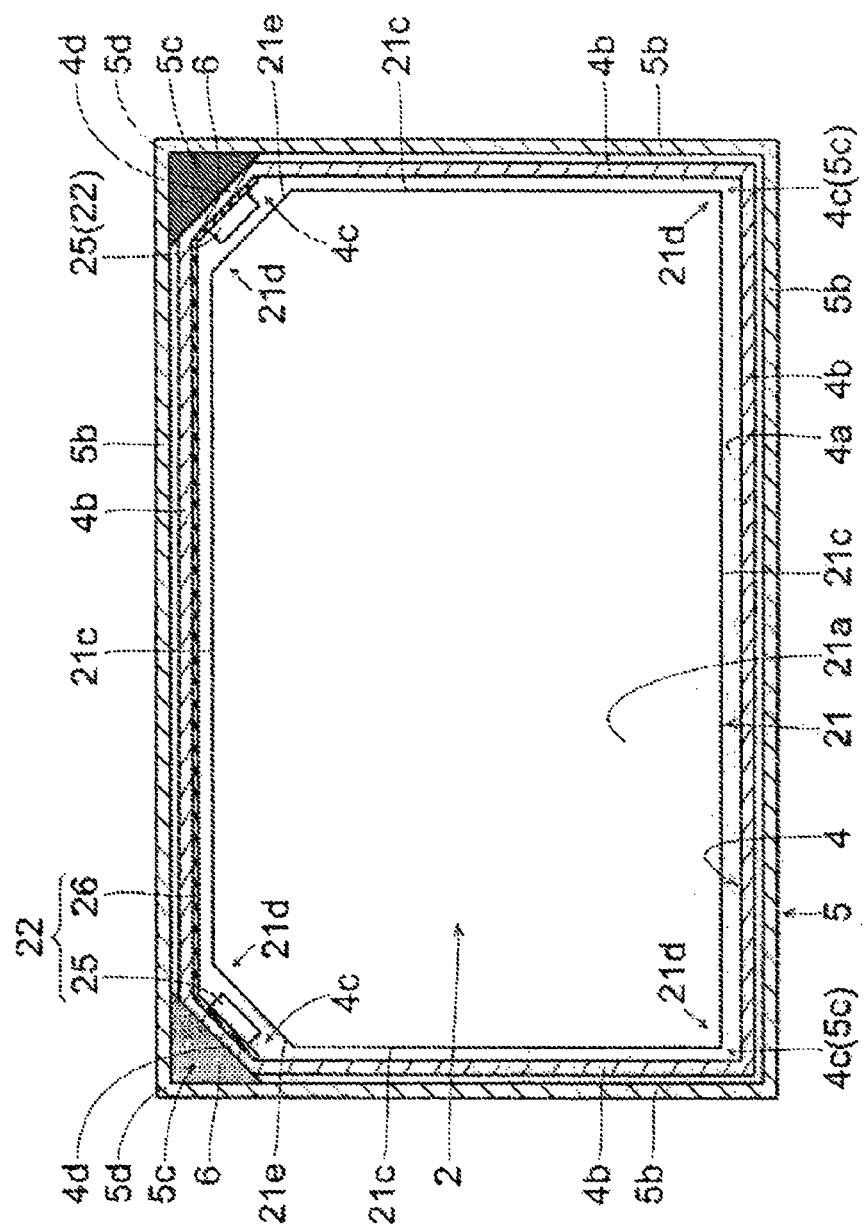
[FIG. 4] is a view for describing structures of a frame and a bezel of the liquid crystal display device according to the first embodiment.

Besides, as shown in FIG. 1 and FIG. 4, near two corner portions 4c of the four corner portions 4c of the frame 4, the inclined surfaces 21e of the light guide plate 21 are each disposed; two portions (first portions) 4d of the side portion 4b of the frame 4, which define the two corner portions 4c, are formed to be a tapered shape that has an inner surface along the inclined surface 21e of the light guide plate 21. In other words, the side portion 4a (which includes the two portions 4d) of one long edge of the frame 4 is bent along the side surface 21c (which includes the two inclined surfaces 21e) of one long edge of the light guide plate 21. And, the LED module 22 is disposed along an inner side surface of the side portion 4b of the one long edge of the frame 4, whereby the LEDs 25 are each disposed near the two portions 4d of the side portion 4b of the frame 4, and the light emission surface of each of the two LEDs 25 faces the corresponding inclined surface 21e of the light guide plate 21. Here, the two other corner portions 4c of the frame 4 are each formed to be a substantially rectangular shape.

The bezel 5, which collaborates with the frame 4 to sandwich the liquid crystal display panel 1 and the backlight unit 2, is obtained by deforming a plate member formed of stainless steel, iron or the like, and includes: a frame-shaped upper surface portion 5a; and a side portion 5b formed vertically on an outer circumference of the upper surface portion 5a. Besides, a region enclosed by the side portion 5b of the bezel 5 defines a substantially rectangular shape that has four corner portions 5c, and each of the four corner portions 5c of the bezel 5 is formed to be a rectangular or substantially rectangular shape. Here, the side portion 5b of the bezel 5 is an example of a "second side portion" of the present invention and the corner portion 5c is an example of a "second corner portion" of the present invention.

And, in the state where the bezel 5 collaborates with the frame 4 to sandwich the liquid crystal display panel 1 and the backlight unit 2, the upper surface portion 5a of the bezel 5 covers an outer edge of the display surface 1a of the liquid crystal display panel 1. Besides, the side portion 5b of the bezel 5 is disposed along an outer surface of the side portion 4b of the frame 4, thereby overlying the side portion 4b of the frame 4. Further, the respective long edges (short edges) of the bezel 5 and of the frame 4 are parallel with each other; and positions of the four corner portions 5c of the bezel 5 and positions of the four corner portions 4c of the frame 4 are substantially aligned with each other.

Here, in the first embodiment, when viewing each of the two corner portions 4c (two corner portions 5c of the bezel 5) of the frame 4 near which the LEDs 25 are situated, the portion (the portion near which the LED 25 is disposed) 4d of the side portion 4b of the frame 4 is thermally connected to a portion (second portion) 5d that is a portion of the side portions 5b of the bezel 5 and defines the corner portion 5c.

Figure 5:
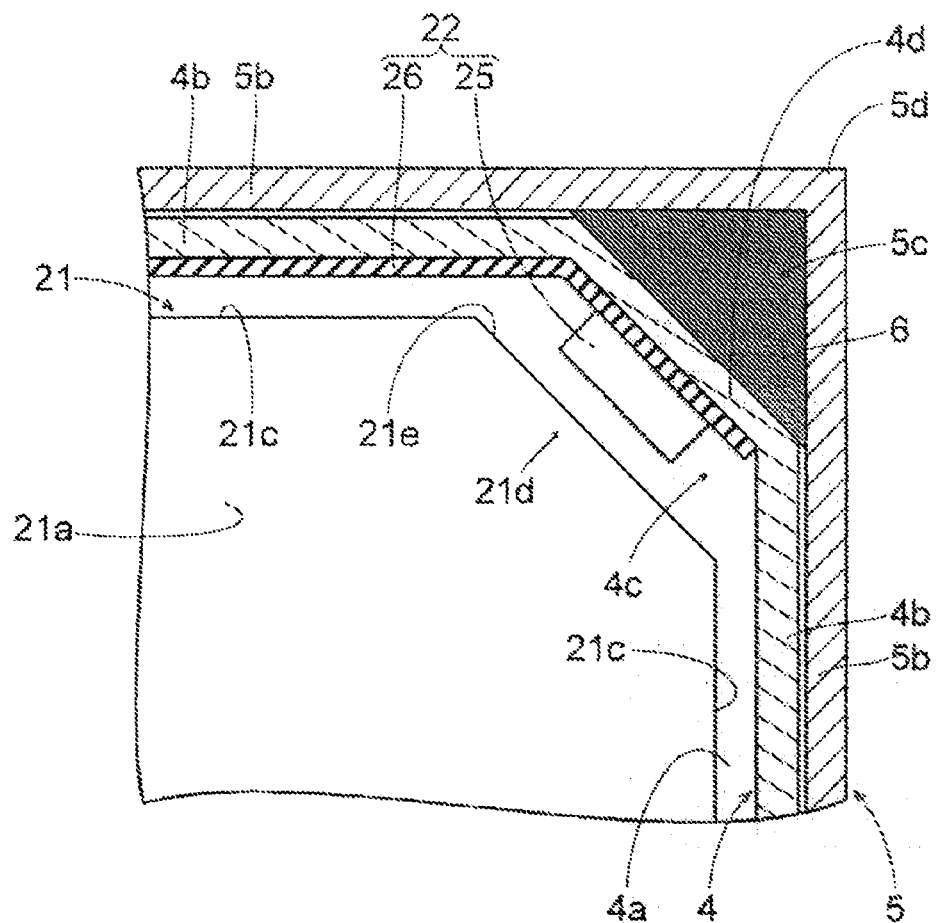
[FIG. 5] is an enlarged view of part (a portion where an LED is situated) of FIG. 4.

Specifically, as shown in FIG. 4 and FIG. 5, when viewing each of the two corner portions 4c (the two corner portions 5c of the bezel 5) of the frame 4 near which the LEDs 25 are situated, the portion 4d of the side portion 4b of the frame 4 is tapered, so that a triangular gap is formed between the portion 4d of the side portion 4b of the frame 4 and the portion 5d of the side portion 5b of the bezel 5. Because of this, in the first embodiment, a heat conductive member 6 is buried in the triangular gap between the portion 4d of the side portion 4b of the frame 4 and the portion 5d of the side portion 5b of the bezel 5, whereby the heat conductive member 6 is made to come into contact with each of the portion 4d of the side portion 4b of the frame 4 and the portion 5d of the side portion 5b of the bezel 5. In other words, the outer surface of the portion 4d of the side portion 4b of the frame 4 and the inner surface of the portion 5d of the side portion 5b of the bezel 5 are thermally connected to each other via the heat conductive member 6.

Here, as a material of the heat conductive member 6, there is a resin heat radiation sheet formed of silicone rubber or the like. Besides, as a method for fixing the heat conductive member 6, it is sufficient to simply insert the heat conductive member 6 into the triangular gap between the portion 4d of the side portion 4b of the frame 4 and the portion 5d of the side portion 5b of the bezel 5; however, it is more preferable to adhere the heat conductive member 6 to the inner surface of the portion 5d of the side portion 5b of the bezel 5 by means of double-coated tape or the like.

In the first embodiment, as described above, the LED 25 is disposed near the inner surface of the portion 4d that is a portion of the side portion 4b of the frame 4 and defines a predetermined corner portion (a corner portion near which the inclined surface 21e of the light guide plate 21 is disposed); and the outer surface of the portion 4d of the side portion 4b of the frame 4 is thermally connected to the portion 5d of the side portion 5b of the bezel 5, whereby heat conduction from the portion 4d of the side portion 4b of the frame 4 to the portion 5d of the side portion 5b of the bezel 5 increases, so that it is possible to easily transmit heat generated from the portion 4d of the side portion 4b of the frame 4 to the side portion 5b of the bezel 5. According to this, the heat generated from the LED 25 is efficiently radiated, and it is possible to alleviate the LED 25 being deteriorated by the heat from itself.

Figure 6:
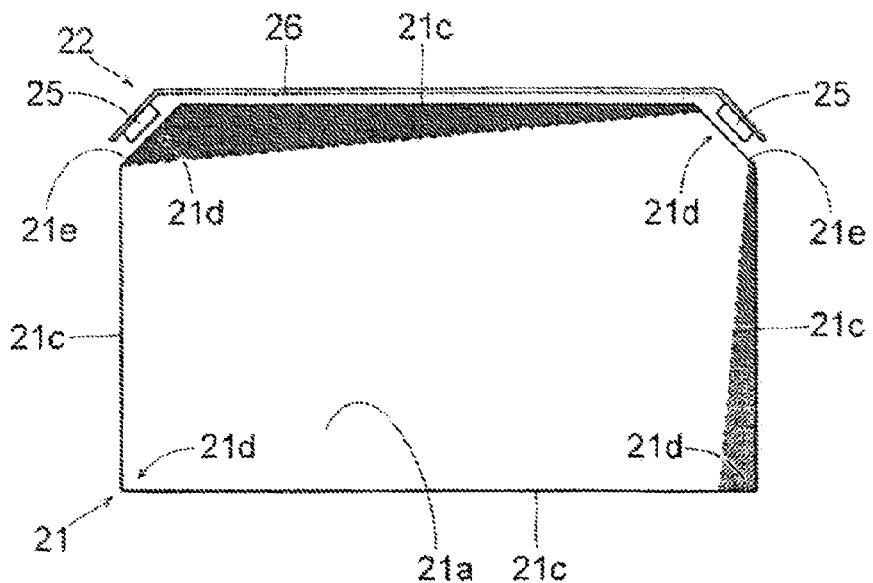
[FIG. 6] is a view for describing behavior of light in an inside of a light guide plate.
Figure 7:
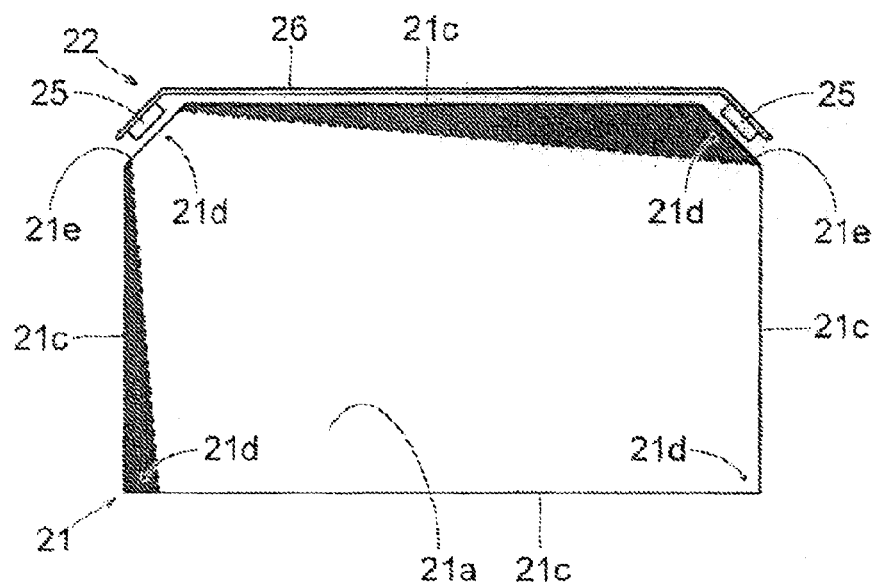
[FIG. 7] is a view for describing behavior of light in an inside of a light guide plate.
Figure 8:
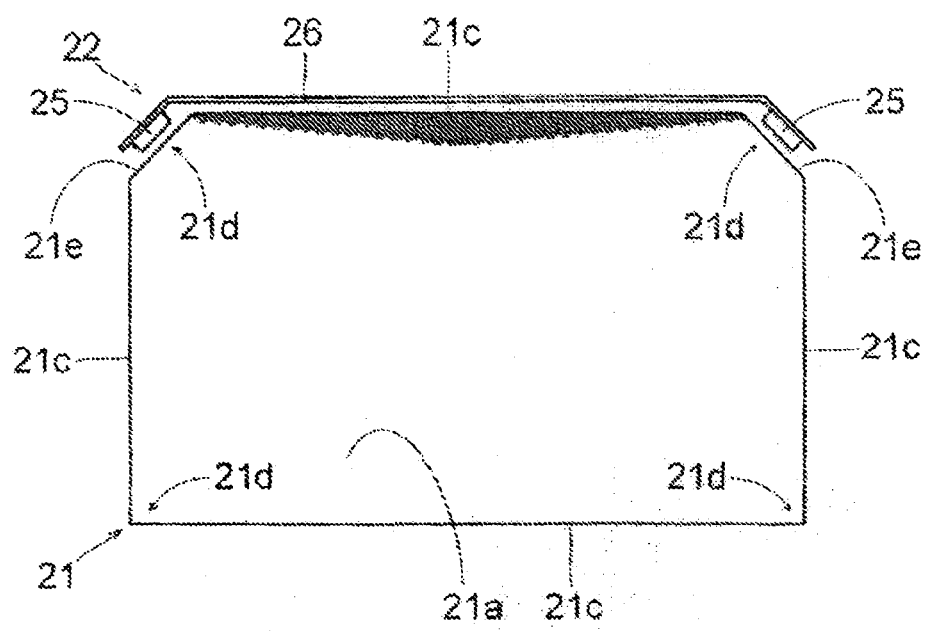
[FIG. 8] is a view for describing behavior of light in an inside of a light guide plate.

Further, in addition to this, the side surfaces 21c of the two corner portions 21d of the four corner portions 21d of the light guide plate 21 are inclined, and the LEDs 25 are each disposed so as to face each of the two inclined surfaces of the light guide plate 21, so that the light from one of the LEDs 25 spreads in the inside of the light guide plate 21 as shown in FIG. 6, while the light from the other of the LEDs 25 spreads in the inside of the light guide plate 21 as shown in FIG. 7. Because of this, as shown in FIG. 8, the light spreads into the substantially entire region of the inside of the light guide plate 21, and the dark region into which the light is unlikely to spread becomes less than conventional. According to this, it is possible to output the surface light, which has less brightness unevenness, from the backlight unit 2. Here, in FIG. 6 to FIG. 8, regions marked by hatching are dark regions, and the other regions are regions into which the light spreads.

As a result of these, in the first embodiment, it becomes easy to achieve a long life of the LED 25 while curbing occurrence of brightness unevenness without causing cost increase and size enlargement.

Figure 9:
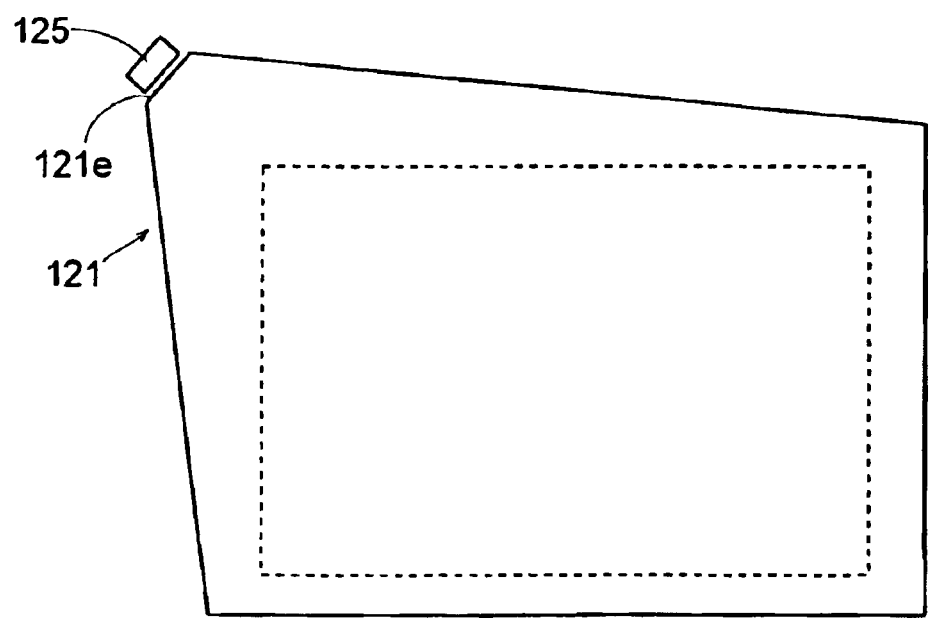
[FIG. 9] is a view in a case where brightness unevenness is reduced by enlarging a light guide plate.

In the meantime, to achieve further reduction of the brightness unevenness by disposing the LED at only one corner portion of the four corner portions of the light guide plate, it is necessary to produce a light guide plate 121 that has a shape as shown in FIG. 9. In other words, light from an LED 125 spreads into an angle range of about ±42° only; accordingly, to spread the light from the LED 125 into a substantially entire region of an effective light emission area (a region enclosed by a broken line), it is necessary to significantly space a light introduction surface 121e of the light guide plate 121 away from the effective light emission area. Because of this, even if it is possible to achieve further reduction of the brightness unevenness, size enlargement is caused.

Besides, in the first embodiment, as described above, the portion 4d, which is a portion of the side portion 4b of the frame 4 and defines the predetermined corner portion 4c, is used as the disposition portion at which the LED 2 is disposed; and the light guide plate 21 is placed on the bottom portion 4a of the frame 4 such that the positions of the four corner portions 4c of the frame 4 and the positions of the four corner portions 21d of the light guide plate 21 are substantially aligned with each other, so that it is easy to dispose the LED 25 such that the LED 25 faces the inclined surface 21e of the light guide plate 21.

Besides, in the first embodiment, as described above, the portion 5d, which defines the predetermined corner portion 5c (the portion near which the LED 25 is situated) of the side portion 5b of the bezel 5, is used as the portion for the thermal connection with the portion (the portion near which the LED 25 is disposed) 4d of the side portion 4b of the frame 4, whereby the portion 4d of the side portion 4b of the frame 4 and the portion 5*d* of the side portion 5*b* of the bezel 5 both define the corner portions; accordingly, by disposing the frame 4 and the bezel 5 such that the position of the corner portion 4*c* of the frame 4 and the position of the corner portion 5*c* of the bezel 5 are substantially aligned with each other, it is easy to thermally connect the portion 4*d* of the side portion 4*b* of the frame 4 and the portion 5*d* of the side portion 5*b* of the bezel 5 to each other.

Besides, in the first embodiment, as described above, the portion 4*d* of the side portion 4*b* of the frame 4 is formed to be the tapered shape that has the inner surface along the inclined surface 21*e* of the light guide plate 21; accordingly, by disposing the LED 25 at the inner surface of the portion 4*d* of the side portion 4*b* of the frame 4, so that it is easy to dispose the LED 25 such that the LED 25 faces the inclined surface 21*e* of the light guide plate 21.

Besides, in the first embodiment, as described above, the heat conductive member 6 is inserted between the portion 4*d* of the side portion 4*b* of the frame 4 and the portion 5*d* of the side portion 5*b* of the bezel 5; accordingly, even if the portion 4*d* of the side portion 4*b* of the frame 4 and the portion 5*d* of the side portion 5*b* of the bezel 5 are not made to directly come into contact with each other, it is possible to thermally connect the portion 4*d* of the side portion 4*b* of the frame 4 and the portion 5*d* of the side portion 5*b* of the bezel 5 to each other.

(Second Embodiment)

Hereinafter, a structure of a display device according to a second embodiment is described with reference to FIG. 10 to FIG. 12.

Figure 10:
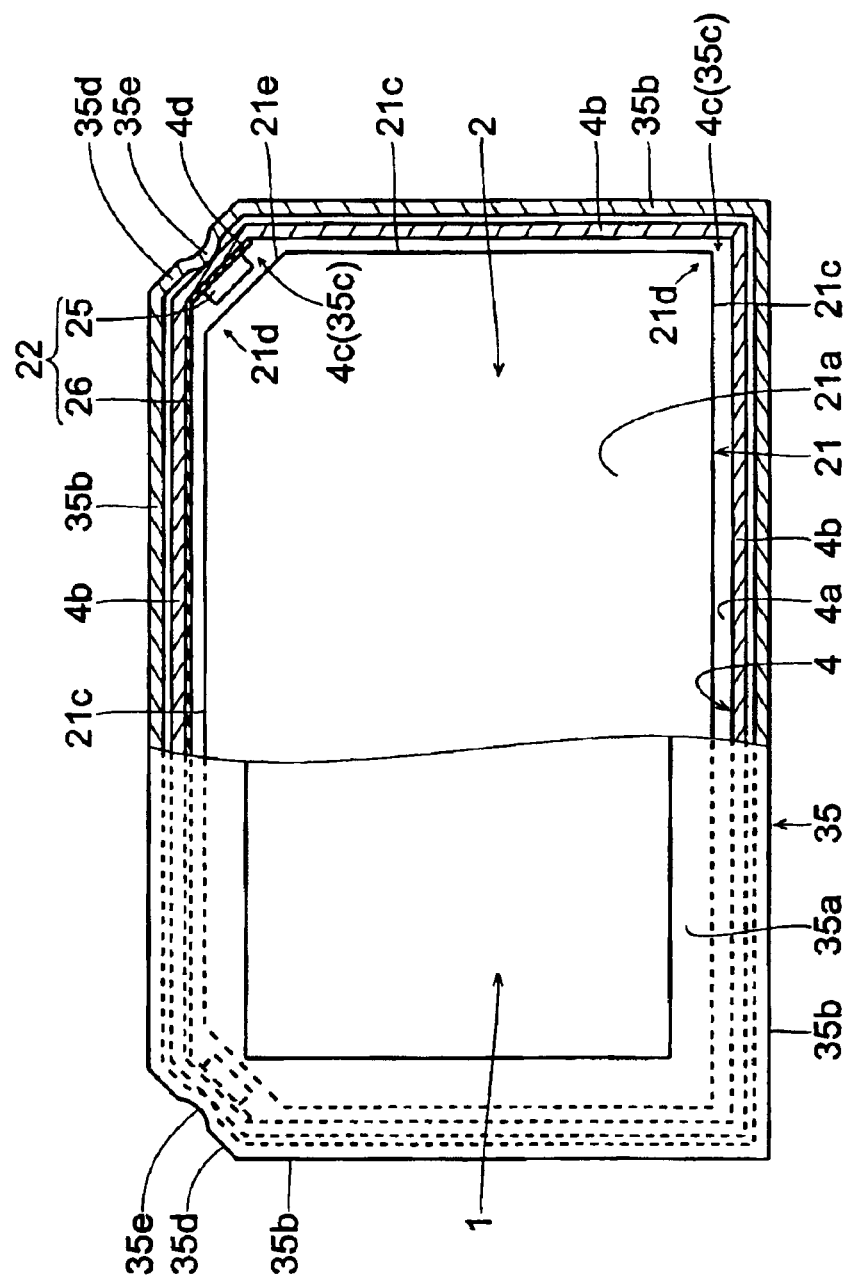
[FIG. 10] is a view for describing structures of a frame and a bezel of a liquid crystal display device according to a second embodiment.
Figure 11:
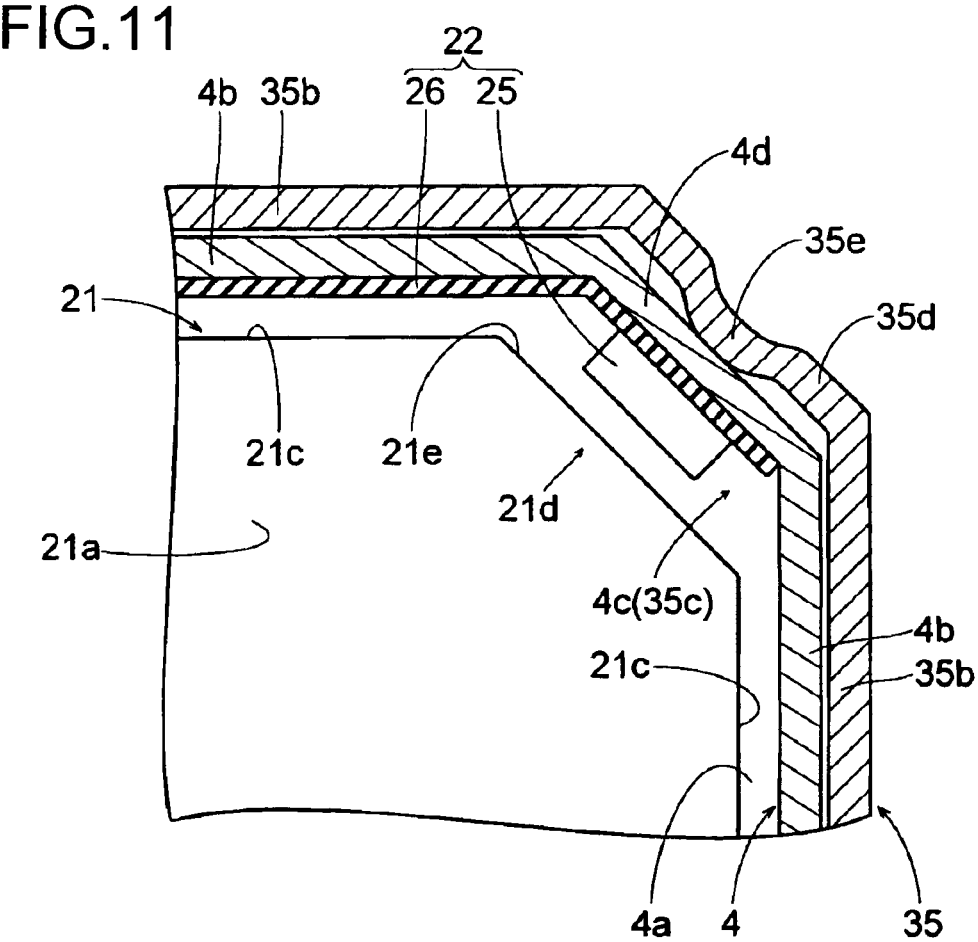
[FIG. 11] is an enlarged view of part (a portion where an LED is situated) of FIG. 10.
Figure 12:
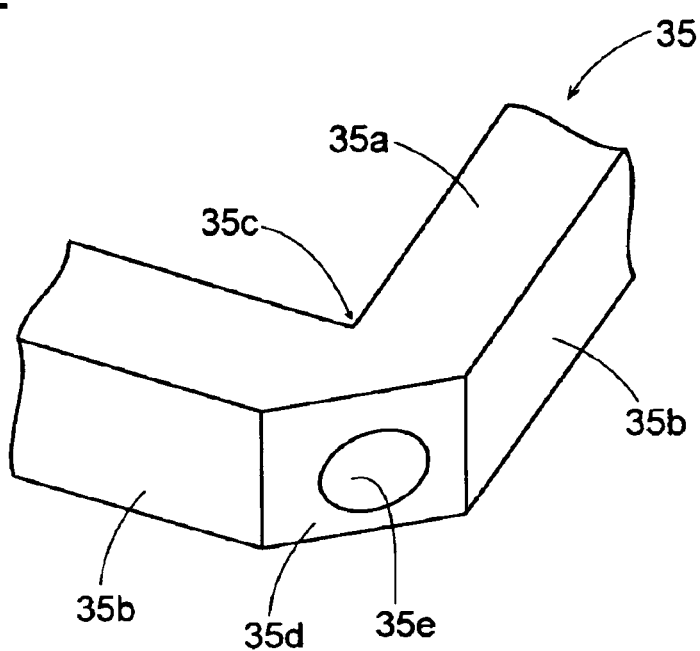
[FIG. 12] is an enlarged perspective view of a portion of a corner portion of the bezel shown in FIG. 10.

The display device (liquid crystal display device) according to the second embodiment uses a metal bezel (second case member) 35 shown in FIG. 10 to FIG. 12 is used, but has the same structure as the first embodiment except that such bezel 35 is used.

The bezel 35, like the bezel 5 in the above first embodiment, includes: a frame-shaped upper surface portion 35*a*; and a side portion (second side portion) 35*b* formed vertically on an outer circumference of the upper surface portion 35*a*; and a region enclosed by the side portion 35*b* is formed to be a substantially rectangular shape that has four corner portions (second corner portion) 35*c*. And, in a state where the bezel 35 collaborates with the frame 4 to sandwich the liquid crystal display panel 1 and the backlight unit 2, the respective long edges (short edges) of the bezel 35 and the frame 4 are parallel with each other; and positions of the four corner portions 35*c* of the bezel 35 and positions of the four corner portions 4*c* of the frame 4 are substantially aligned with each other. Besides, the side portion 35*b* of the bezel 35 is situated along the outer surface of the side portion 4*b* of the frame 4.

Here, in the second embodiment, the inclined surfaces 21*e* of the light guide plate 21 are each disposed near two corner portions 35*c* of the four corner portions 35*c* of the bezel 35; and two portions 35*d*, which are portions of the side portion 35*b* of the bezel 35 and define the two side portions 35*c*, are each formed to be a tapered shape (a shape along the inclined surface 21*e* of the light guide plate 21). In other words, when viewing each of the two corner portions 4*c* (the two corner portions 35*c* of the bezel 35) of the frame 4 near which the LEDs 25 are situated, the portion 4*d* of the side portion 4*b* of the frame 4 and the portion 35*d* of the side portion 35*b* of the bezel 35 both are tapered; and the shape of the portion 35*d* of the side portion 35*b* of the bezel 35 reflect the shape of the portion 4*d* of the side portion 4*b* of the frame 4. Here, each of the two other corner portions 35*c* of the bezel 35 is formed to be a substantially rectangular shape.

Besides, in the second embodiment, when viewing each of the two corner portions 4*c* (the two corner portions 35*c* of the bezel 35) of the frame 4 at which the LEDs 25 are situated, the portion 35*d* of the side portion 35*b* of the bezel 35 is provided thereon with a circular protrusion portion 35*e* that protrudes toward the portion 4*d* of the side portion 4*b* of the frame 4. Here, for example, the protrusion portion 35*e* formed on the portion 35*d* of the side portion 35*b* of the bezel 35 is obtained by applying draw forming to a metal plate member that forms the bezel 35.

And, in the second embodiment, at each of the two corner portions 4*c* (the two corner portions 35*c* of the bezel 35) of the frame 4 at which the LEDs 25 are situated, the protrusion portion 35*e* formed on the portion 35*d* of the side portion 35*b* of the bezel 35 directly thermally comes into contact with the outer surface of the portion 4*d* of the side portion 4*b* of the frame 4, so that the portion 4*d* of the side portion 4*b* of the frame 4 and the portion 35*d* (protrusion portion 35*e*) of the side portion 35*b* of the bezel 35 are thermally connected to each other.

In the second embodiment, according to the above structure, it becomes possible to obtain the same effect as the first embodiment.

Besides, in the second embodiment, as described above, the portion 35*d* of the side portion 35*b* of the bezel 35 is formed to be the tapered shape that reflects the shape of the portion 4*d* of the side portion 4*b* of the frame 4, so that the portion 4*d* of the side portion 4*b* of the frame 4 and the portion 35*d* of the side portion 35*b* of the bezel 35 face in parallel with each other, which is preferable when thermally connecting them to each other by making the portion 4*d* of the side portion 4*b* of the frame 4 and the portion 35*d* of the side portion 35*b* of the bezel 35 come into contact with each other.

Further, in the second embodiment, as described above, the portion 35*d* of the side portion 35*b* of the bezel 35 is provided thereon with the circular protrusion portion 35*e* that protrudes toward the portion 4*d* of the side portion 4*b* of the frame 4, so that it is possible to surely maintain the state where the portion 4*d* of the side portion 4*b* of the frame 4 and the portion 35*d* of the side portion 35*b* of the bezel 35 are in direct contact with each other. In other words, it is possible to surely achieve the thermal contact between the portion 4*d* of the side portion 4*b* of the frame 4 and the portion 35*d* of the side portion 35*b* of the bezel 35.

Here, in the structure according to the second embodiment, the protrusion portion 35*e* formed on the portion 35*d* of the side portion 35*b* of the bezel 35 is not especially limited; for example, although not shown, a linear-shape protrusion portion may be formed on the portion 35*d* of the side portion 35*b* of the bezel 35.

Figure 13:
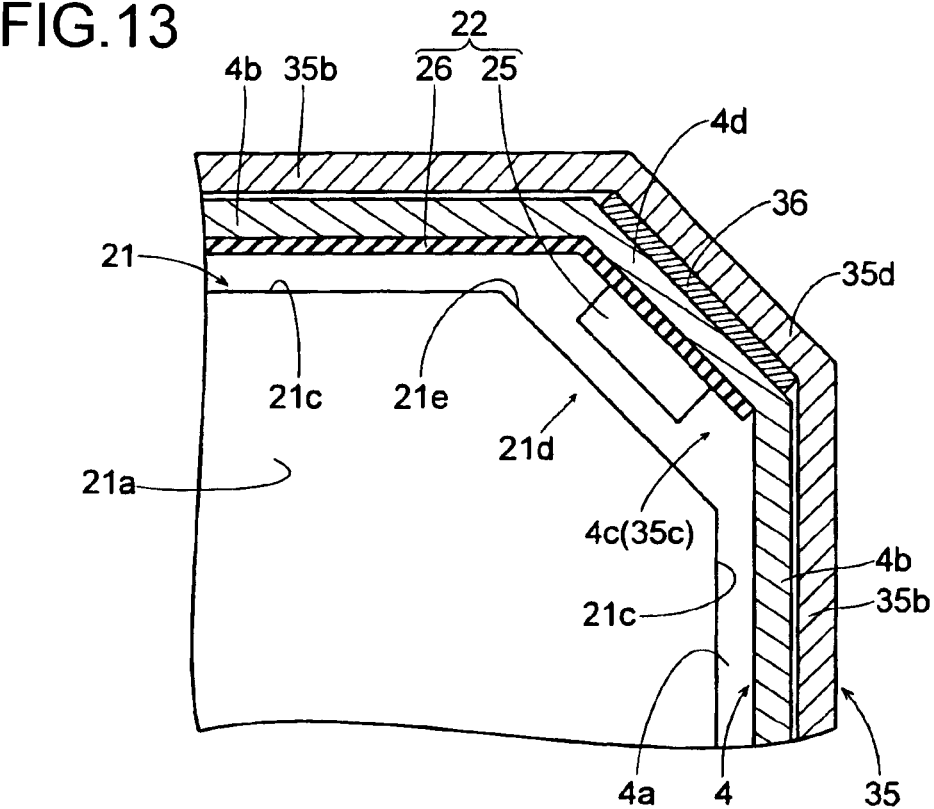
[FIG. 13] is a view (an enlarged view of a portion where an LED is situated) for describing structures of a frame and a bezel of a liquid crystal display device according to a modification of the second embodiment.

Besides, in the structure according to the second embodiment, as shown in FIG. 13, the protrusion portion may not be formed on the portion 35*d* of the side portion 35*b* of the bezel 35, but a heat conductive member 36 may be inserted between the portion 4*d* of the side portion 4*b* of the frame 4 and the portion 35*d* of the side portion 35*b* of the bezel 35.

Figure 14:
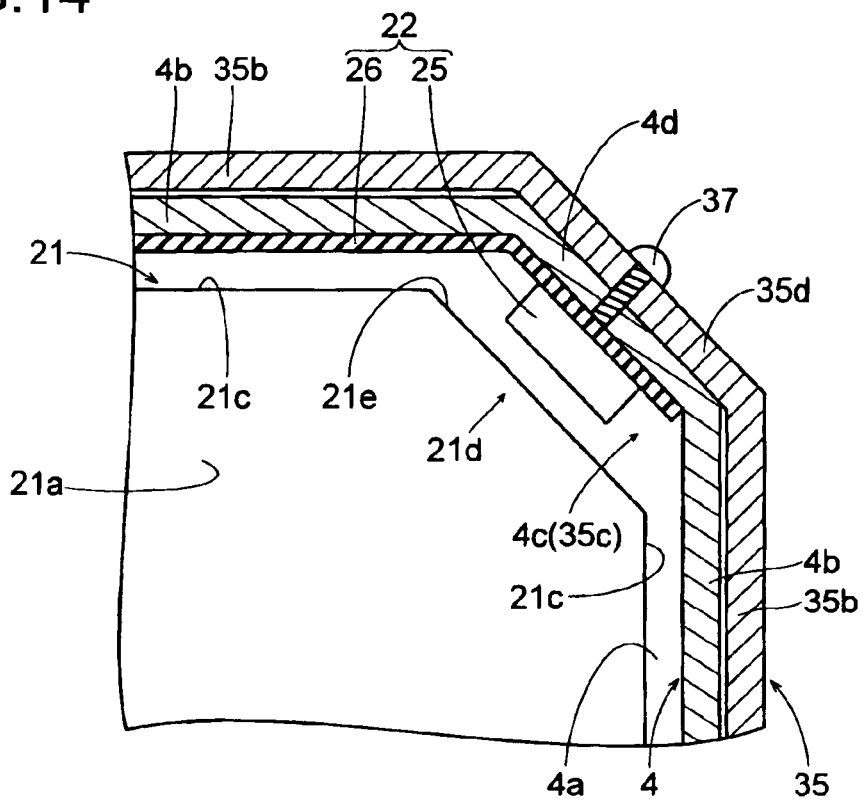
[FIG. 14] is a view (an enlarged view of a portion where an LED is situated) for describing structures of a frame and a bezel of a liquid crystal display device according to a modification of the second embodiment.

Besides, in the structure according to the second embodiment, as shown in FIG. 14, the protrusion portion may not be formed on the portion 35*d* of the side portion 35*b* of the bezel 35, but the portion 35*d* of the side portion 35*b* of the bezel 35 may be fixed, by means of a screw, to the portion 4*d* of the side portion 4*b* of the frame 4, whereby the portion 4*d* of the side portion 4*b* of the frame 4 and the portion 35*d* of the side portion 35*b* of the bezel 35 may be forcibly made to come into contact with each other. In this case, it is possible to easily and surely connect thermally the portion 4*d* of the side portion 4*b* of the frame 4 and the portion 35*d* of the side portion 35*b* of the bezel 35 to each other.

(Third Embodiment)

Hereinafter, a structure of a display device according to a third embodiment is described with reference to FIG. 15 to FIG. 19.

Figure 15:
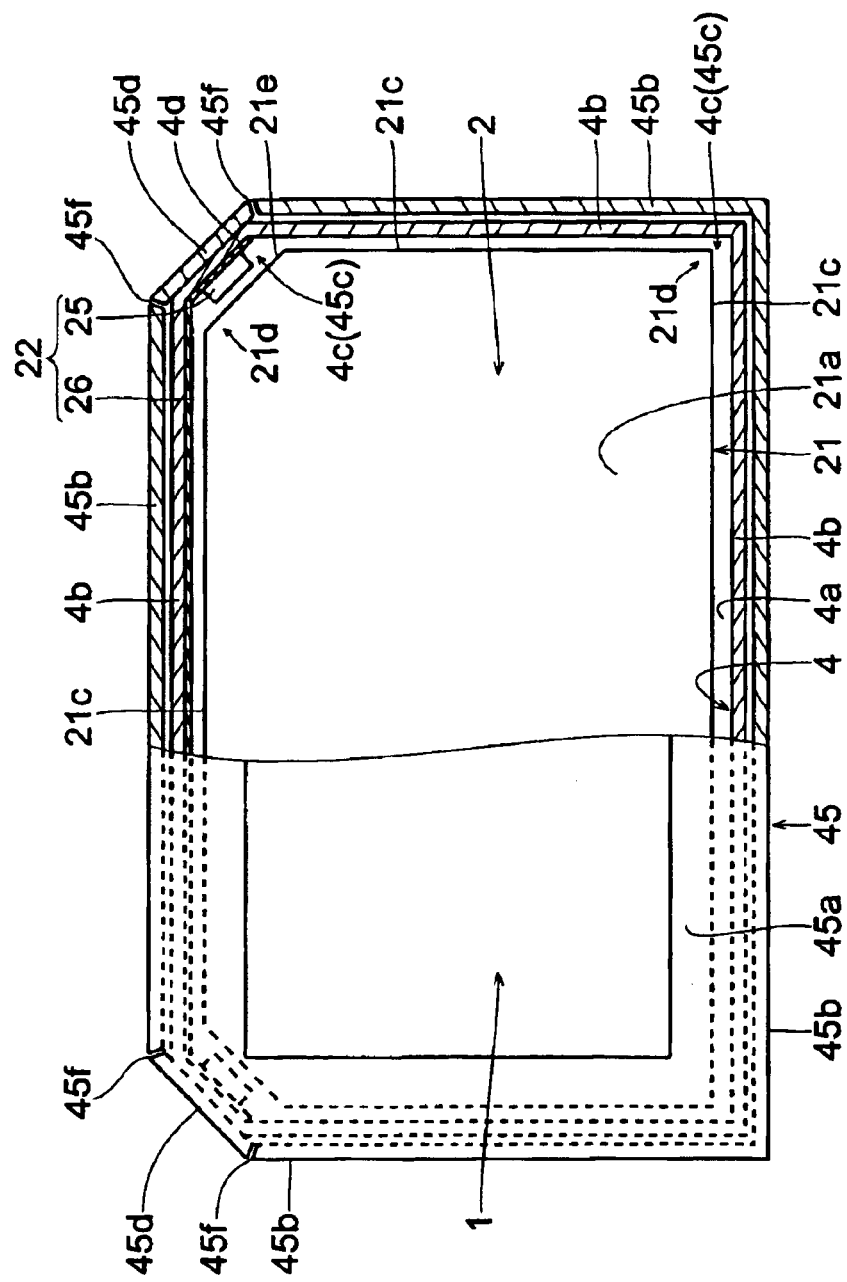
[FIG. 15] is a view for describing structures of a frame and a bezel of a liquid crystal display device according to a third embodiment.
Figure 16:
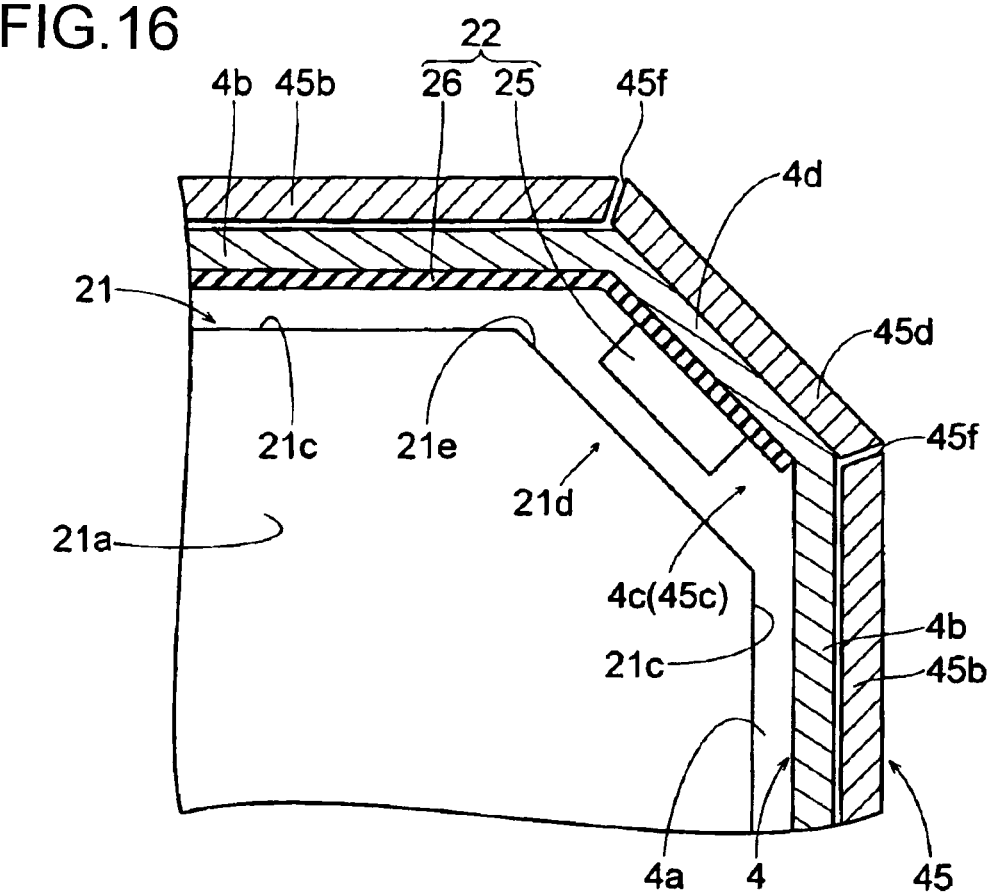
[FIG. 16] is an enlarged view of part (a portion where an LED is situated) of FIG. 15.
Figure 17:
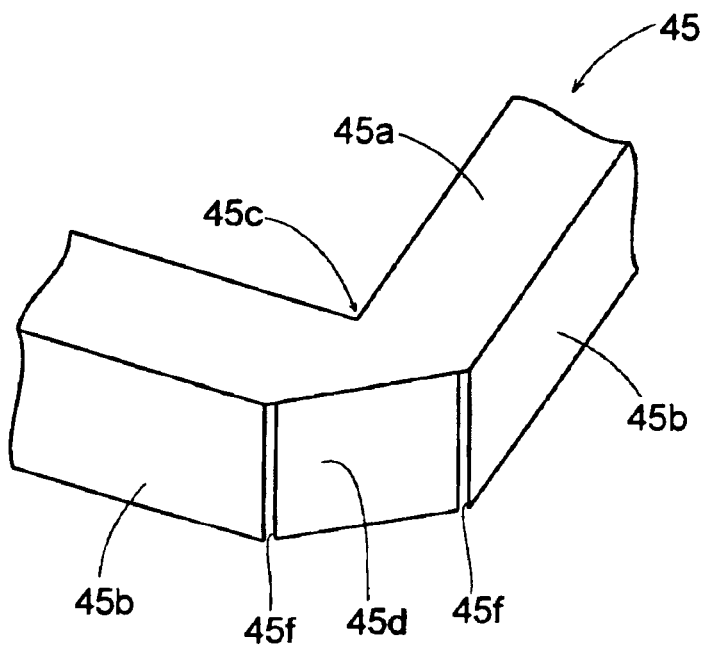
[FIG. 17] is an enlarged perspective view of a portion of a corner portion of the bezel shown in FIG. 15.

The display device (liquid crystal display device) according to the third embodiment uses a metal bezel (second case member) 45 shown in FIG. 15 to FIG. 17 is used, but has the same structure as the first embodiment except that such bezel 45 is used.

The bezel 45, like the bezel 5 in the above first embodiment, includes: a frame-shaped upper surface portion 45a; and a side portion (second side portion) 45b formed vertically on an outer circumference of the upper surface portion 45a; and a region enclosed by the side portion 45b is formed to be a substantially rectangular shape that has four corner portions (second corner portion) 45c. And, in a state where the bezel 45 collaborates with the frame 4 to sandwich the liquid crystal display panel 1 and the backlight unit 2, the respective long edges (short edges) of the bezel 45 and the frame 4 are parallel with each other; and positions of the four corner portions 45c of the bezel 45 and positions of the four corner portions 4c of the frame 4 are substantially aligned with each other. Besides, the side portion 45b of the bezel 45 is situated along the outer surface of the side portion 4b of the frame 4.

Here, in the third embodiment, the inclined surfaces 21e of the light guide plate 21 are each disposed near two corner portions 45c of the four corner portions 45c of the bezel 45; and two portions 45d, which are portions of the side portion 45b of the bezel 45 and define the two side portions 45c, are each formed to be a tapered shape (a shape along the inclined surface 21e of the light guide plate 21). In other words, when viewing each of the two corner portions 4c (the two corner portions 45c of the bezel 45) of the frame 4 near which the LEDs 25 are situated, the portion 4d of the side portion 4b of the frame 4 and the portion 45d of the side portion 45b of the bezel 45 both are tapered; and the shape of the portion 45d of the side portion 45b of the bezel 45 reflect the shape of the portion 4d of the side portion 4b of the frame 4. Here, each of the two other corner portions 45c of the bezel 45 is formed to be a substantially rectangular shape.

Further, in the third embodiment, when viewing each of the two corner portions 4c (the two corner portions 45c of the bezel 45) of the frame 4 near which the LEDs 25 are situated, the portion 45d of the side portion 45b of the bezel 45 is connected to the upper surface portion 45a, and separated from other portions (portions other than the portion 45d) of the side portion 45b. In other words, slits 45f are formed between the portion 45d of the side portion 45b of the bezel 45 and the other portions; because of this, the portion 45d of the side portion 45b of the bezel 45 is displaceable with respect to a border, that is, a fulcrum, with the upper surface portion 45a.

Figure 18:
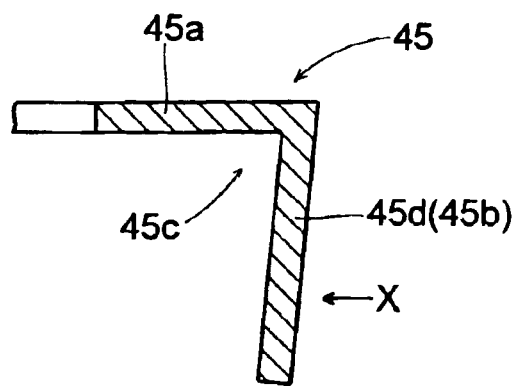
[FIG. 18] is an enlarged sectional view of a portion of a corner portion of the bezel shown in FIG. 15.
Figure 19:
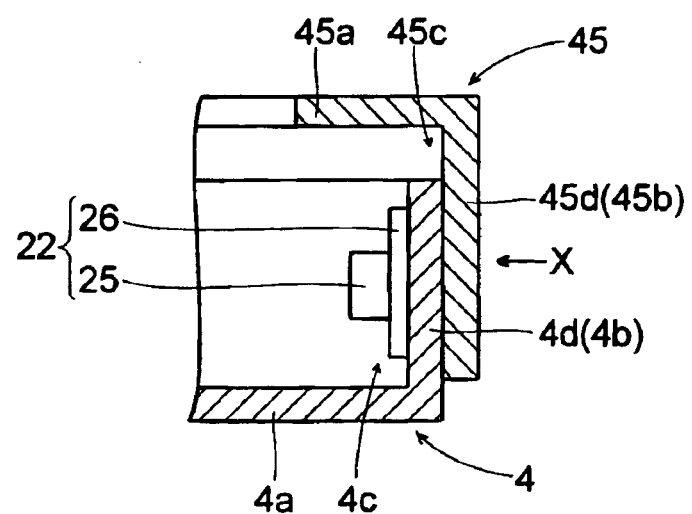
[FIG. 19] is a sectional view when a frame is disposed on the bezel shown in FIG. 18.

And, in the third embodiment, as shown in FIG. 18 and FIG. 19, at each of the two corner portions 4c (the two corner portions 45c of the bezel 45) of the frame 4 near which the LEDs 25 are situated, the portion 45d of the side portion 45b of the bezel 45 is inclined in an X direction in advance; when disposing the bezel 45, the portion 45d of the side portion 45b is elastically deformed, whereby the side portion 45b of the bezel 45 is disposed on the outer surface side of the of the side portion 4b of the frame 4. According to this, the portion 45d of the side portion 45b of the bezel 45 is held while biasing (pushing) the portion 4d of the side portion 4b of the frame 4; and as a result, the portion 45d of the side portion 45b of the bezel 45 is thermally directly connected to the portion 4d of the side portion 4b of the frame 4.

In the third embodiment, according to the above structure, it becomes possible to obtain the same effect as the first embodiment.

Besides, in the third embodiment, as described above, the portion 4d of the side portion 4b of the frame 4 and the portion 45d of the side portion 45b of the bezel 45 face each other; and the portion 45d of the side portion 45b of the bezel 45 biases and holds the portion 4d of the side portion 4b of the frame 4, whereby the portion 45d of the side portion 45b of the bezel 45 becomes unlikely to go away from the portion 4d of the side portion 4b of the frame 4, so that it is possible to more surely achieve thermal connection between the portion 4d of the side portion 4b of the frame 4 and the portion 45d of the side portion 45b of the bezel 45.

In this case, the portion 45d of the side portion 45b of the bezel 45 is connected to the upper surface portion 45a, and separated from the other portions (portions other than the portion 45d) of the side portion 45b, whereby the portion 45d of the side portion 45b of the bezel 45 is displaceable with respect to the border, that is, the fulcrum, with the upper surface portion 45a, so that the portion 45d of the side portion 45b of the bezel 45 is easily able to have a spring characteristic (a bias force that biases the portion 4d of the side portion 4b of the frame 4).

Here, in the structure according to the third embodiment, although not shown, the portion 45d of the side portion 45b of the bezel 45 may be designed so as to come to an inner position.

Figure 20:
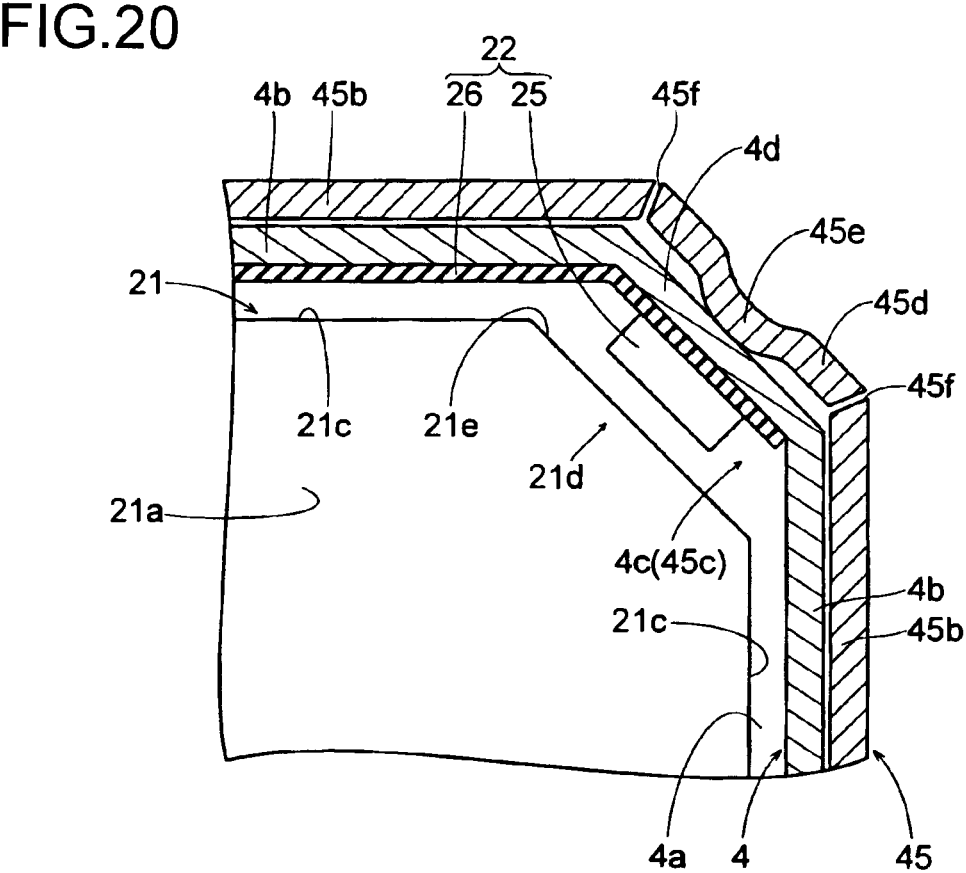
[FIG. 20] is a view (an enlarged view of a portion where an LED is situated) for describing structures of a frame and a bezel of a liquid crystal display device according to a modification of the third embodiment.
Figure 21:
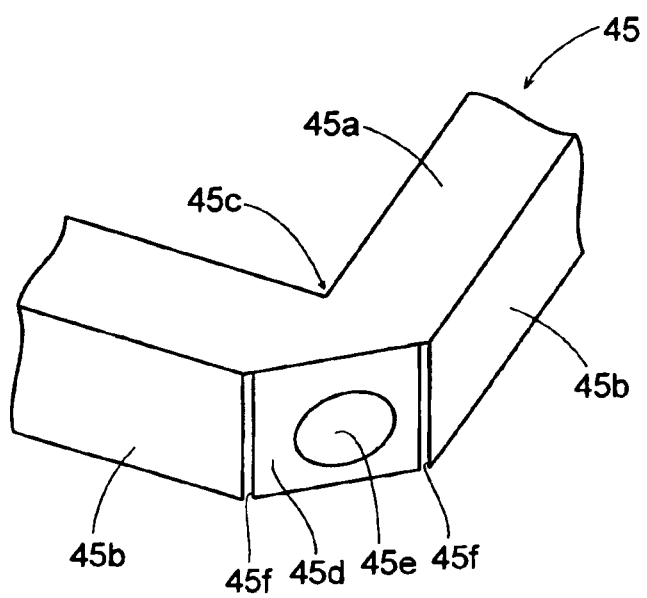
[FIG. 21] is an enlarged perspective view of a portion of a corner portion of the bezel shown in FIG. 20.

Besides, in the structure according to the third embodiment, as shown in FIG. 20 and FIG. 21, a protrusion portion 45e may be formed on the portion 45d of the side portion 435b of the bezel 45; and the protrusion portion 45e formed on the portion 45d of the side portion 435b of the bezel 45 may be made to directly come into contact with the outer surface of the portion 4d of the side portion 4b of the frame 4. In other words, the structure according to the third embodiment and the structure according to the second embodiment may be combined with each other.

Here, it should be understood that the embodiments disclosed this time are examples in all respects and not limiting. The scope of the present invention is not indicated by the above description of the embodiments but by the claims, and all modifications within the scope of the claims and the meaning equivalent to the claims are covered.

For example, in the above embodiments, the LED is disposed near each of the two corner portions of the four corner portions of the light guide plate; however, the present invention is not limited to this, and the LED may be disposed near each of three corner portions of the four corner portions of the light guide plate. In other words, three or more corner portions of the four corner portions of the light guide plate may be formed to be inclined surfaces; and each of the three or more inclined surfaces may be made to function as the light introduction surface. According to this structure, the dark region becomes smaller, and it is possible to further reduce occurrence of brightness unevenness. Besides, the LED may be disposed near only one corner portion of the four corner portions of the light guide plate.

Figure 22:
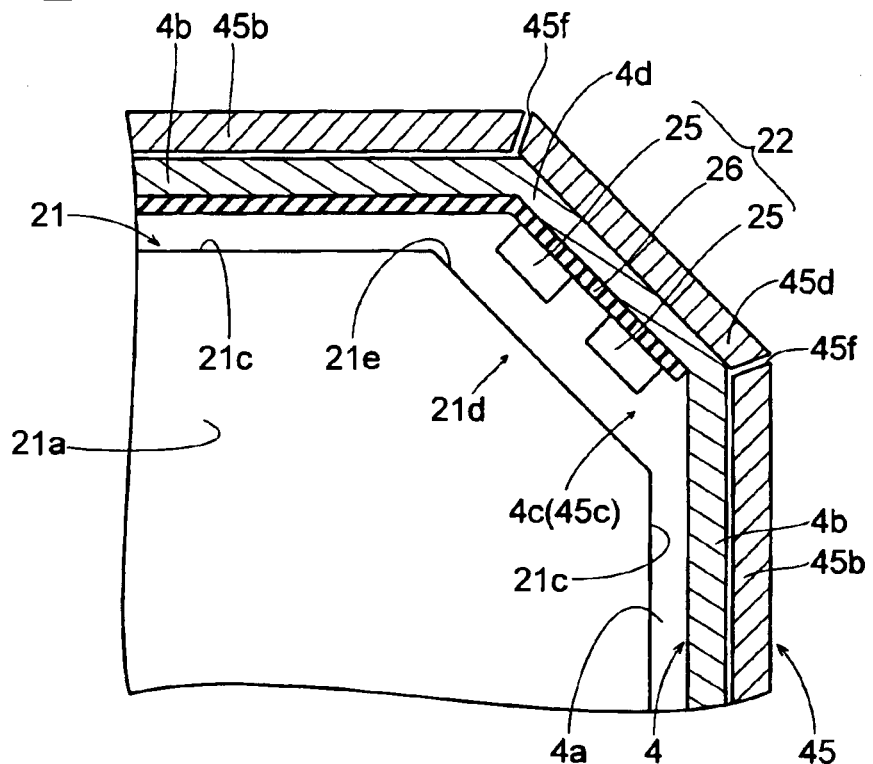
[FIG. 22] is an enlarged view of a portion where an LED of a liquid crystal display device according to a modification of the present invention is situated.

Besides, in the above embodiments, one LED is disposed near one inclined surface (light introduction surface) of the light guide plate; however, the present invention is not limited to this, and a plurality of LEDs may be disposed near one inclined surface of the light guide plate. For example, describing the structure according to the above third embodiment as an example, as shown in FIG. 22, two LEDs 25 may be disposed so as to face one inclined surface (light guide plate) 21e of the light guide plate 21.

Figure 23:
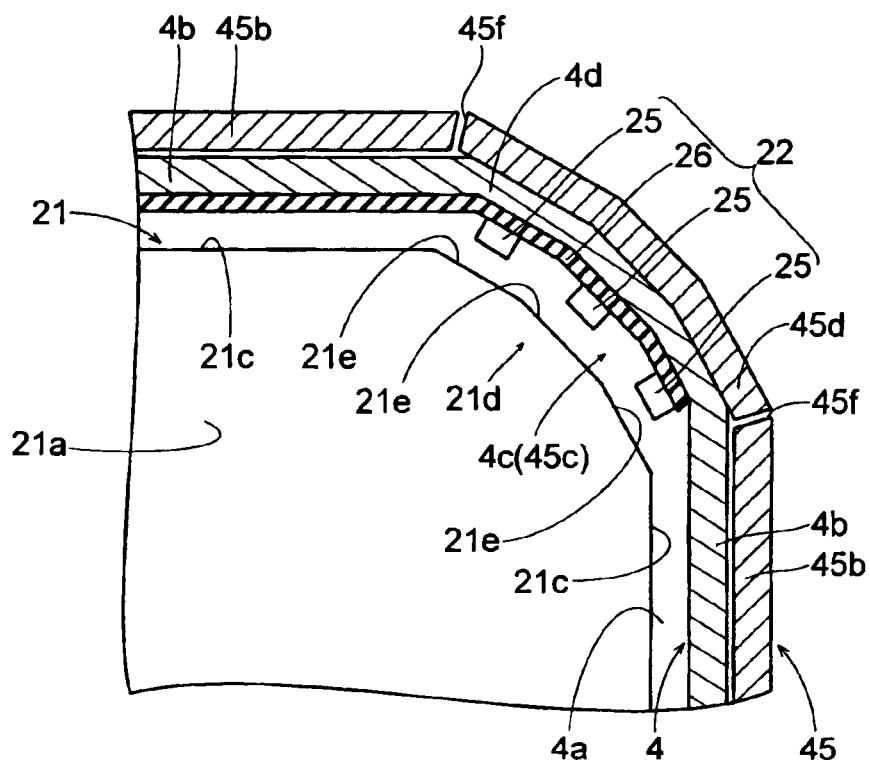
[FIG. 23] is an enlarged view of a portion where an LED of a liquid crystal display device according to a modification of the present invention is situated.
Figure 24:
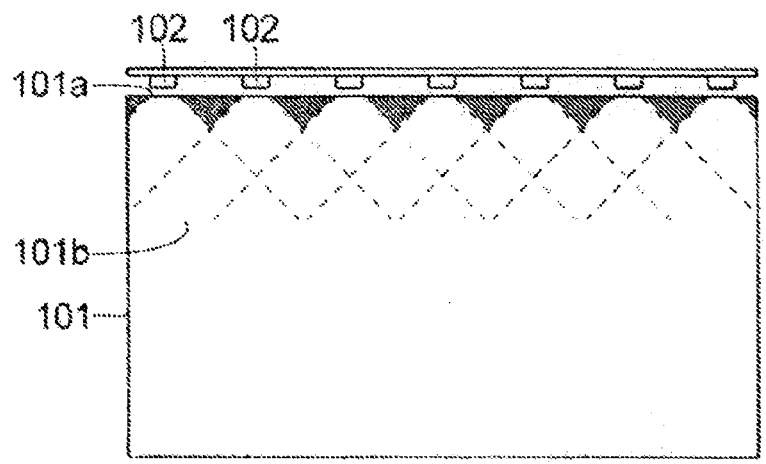
[FIG. 24] is a view simply describing a conventional backlight unit.
Figure 25:
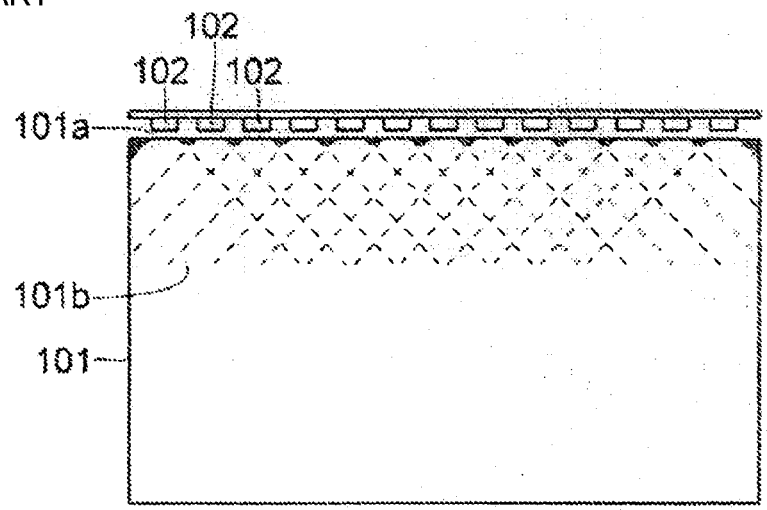
[FIG. 25] is a view simply describing a conventional backlight unit.
Figure 26:
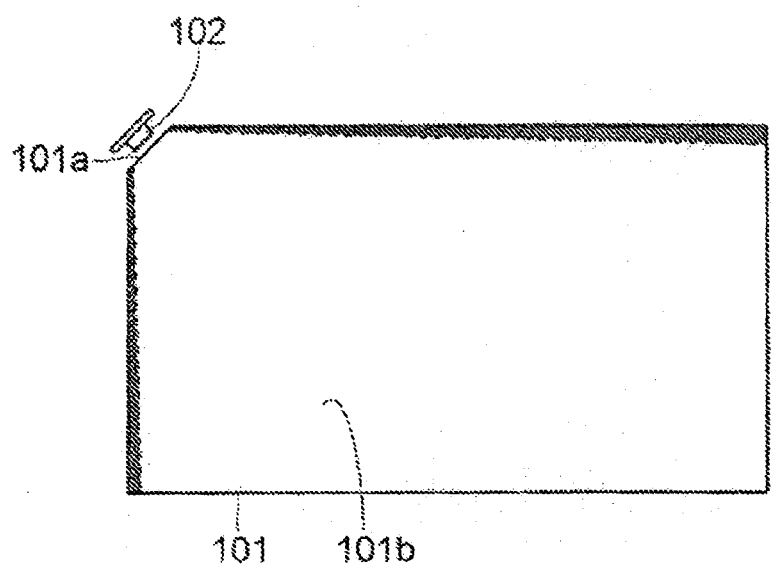
[FIG. 26] is a view simply describing a conventional proposed backlight unit.

Besides, in the above embodiments, one inclined surface (light introduction surface) is formed on one corner portion of the light guide plate; however, the present invention is not limited to this, and a plurality of inclined surfaces having inclination angles different from each other may be formed on one corner portion of the light guide plate; and the LED may be disposed near each of the plurality of inclined surfaces. In other words, the light introduction surface may have a multi-surface structure. For example, describing the structure according to the above third embodiment as an example, as shown in FIG. 23, three inclined surfaces (light introduction surface) 21e may be formed on one corner portion 21d of the light guide plate 21; and one LED 25 may be disposed near each of the three inclined surfaces 21e. Here, in this case, it is preferable that the portion 4d of the side portion 4b of the frame 4 is formed to be a shape along the three inclined surfaces 21e of the light guide plate 21; and the portion 45d of the side portion 45b of the bezel 45 is formed to be a shape along the portion 4d of the side portion 4b of the frame 4.

REFERENCE SIGNS LIST 1 liquid crystal display panel (display panel)
1a display surface
2 backlight unit
4 frame (first case member)
4a bottom portion
4b side portion (first side portion)
4c corner portion (first corner portion)
4d portion (first portion)
5, 35, 45 bezel (second case member)
5a, 35a, 45a upper surface portion
5b, 35b, 45b side portion (first side portion)
5c, 35c, 45c corner portion (second corner portion)
5d, 35d, 45d portion (second portion)
6, 36 heat conductive member
21 light guide plate
21a ceiling surface
21b rear surface
21c side surface
21d corner portion
21e inclined surface
25 LED (light emitting element)
35e, 45e protrusion portion
37 screw
45f slit

The invention claimed is:

1. A display device comprising:
a light guide plate that includes a plurality of corner portions;
a light emitting element that is disposed at least at one corner portion of the plurality of the light guide plate;
a display panel that is disposed on the light guide plate;
a first case member that includes: a bottom portion on which the light guide plate is placed; and a first side portion that encloses at least part of a circumference of the light guide plate; and
a second case member that includes: an upper surface portion that is disposed on the display panel; and a second side portion that encloses at least part of the circumference of the light guide plate; wherein
the light emitting element is disposed at a first portion of the first side portion of the first case member;
the first portion of the first side portion of the first case member is thermally connected to a second portion of the second side portion of the second case member;
the light guide plate includes: a ceiling surface; a rear surface; and a side surface that connects to the ceiling surface and the rear surface;
a side surface of the one corner portion of the plurality of corner portions, at which the light emitting element is disposed, is obliquely inclined with respect to another side surface; and
the light emitting element is disposed at the first portion of the first side portion of the first case member so as to face the inclined side surface of the light guide plate.

2. The display device according to claim 1, wherein
a region enclosed by the first side portion of the first case member includes a plurality of first corner portions; and
the first portion of the first side portion of the first case member defines at least one of the plurality of first corner portions of the first case member.

3. The display device according to claim 2, wherein
a region enclosed by the second side portion of the second case member includes a plurality of corner portions; and
the second portion of the second side portion of the second case member defines at least one of the plurality of second corner portions of the second case member.

4. The display device according to claim 1, wherein
the first portion of the first side portion of the first case member includes a tapered shape along the inclined side surface of the light guide plate.

5. The display device according to claim 4, wherein
a heat conductive member is inserted between the first portion of the first side portion of the first case member and the second portion of the second side portion of the second case member; and
the first portion of the first side portion of the first case member and the second portion of the second side portion of the second case member are thermally connected to each other via the heat conductive member.

6. The display device according to claim 4, wherein
the second portion of the second side portion of the second case member defines a tapered shape that reflects a shape of the first portion of the first side portion of the first case member.

7. The display device according to claim 6, wherein
the second portion of the second side portion of the second case member is provided thereon with a protrusion portion that protrudes toward the first side portion of the first case member; and
the first portion of the first side portion of the first case member and the protrusion portion provided on the second portion of the second side portion of the second case member are thermally connected to each other.

8. The display device according to claim 6, wherein
the second portion of the second side portion of the second case member includes a spring characteristic; and
the second portion of the second side portion of the second case member is held while biasing the first portion of the first side portion of the first case member.

9. The display device according to claim 8, wherein
the second portion of the second side portion of the second case member is connected to the upper surface portion, and separated from another portion of the second side portion.

10. The display device according to claim 6, wherein
the second portion of the second side portion of the second case member is fixed, by means of a screw, to the first portion of the first side portion of the first case member.

11. The display device according to claim 1, wherein the first case member and the second case member are each formed of a metal.

* * * * *